United States Patent [19]

Sluijter et al.

[11] Patent Number: 5,280,620

[45] Date of Patent: Jan. 18, 1994

[54] COUPLING NETWORK FOR A DATA PROCESSOR, INCLUDING A SERIES CONNECTION OF A CROSS-BAR SWITCH AND AN ARRAY OF SILOS

[75] Inventors: Robert J. Sluijter; Hendrik D. L. Hollmann; Cornelis M. Huizer; Hendrik Dijkstra, all of Eindhoven, Netherlands

[73] Assignee: U.S. Philips Corporation, New York, N.Y.

[21] Appl. No.: 4,328

[22] Filed: Jan. 14, 1993

Related U.S. Application Data

[63] Continuation of Ser. No. 446,491, Dec. 5, 1989, abandoned.

[30] Foreign Application Priority Data

Dec. 16, 1988 [NL] Netherlands ............... 8802079

[51] Int. Cl.⁵ ................ G06F 13/00; G06F 15/16
[52] U.S. Cl. ............... 395/800; 364/DIG. 1; 364/228; 364/229; 364/238.3
[58] Field of Search ............ 364/DIG.; 395/200, 250, 395/325, 400, 425, 500, 800

[56] References Cited

U.S. PATENT DOCUMENTS

| | | | |
|---|---|---|---|
| 3,718,912 | 2/1973 | Hasbrouck et al. | 364/200 |
| 3,970,993 | 7/1976 | Finnila | 364/200 |
| 4,095,278 | 6/1978 | Kihara | 364/200 |
| 4,109,311 | 8/1978 | Blum et al. | 364/200 |
| 4,236,204 | 11/1980 | Groves | 364/200 |
| 4,276,611 | 6/1981 | Jansen et al. | 364/900 |
| 4,293,907 | 10/1981 | Huang et al. | 364/200 |
| 4,467,409 | 8/1984 | Potash et al. | 364/200 |
| 4,553,203 | 11/1985 | Rau et al. | 364/200 |
| 4,689,740 | 8/1987 | Moelands et al. | 364/DIG. 1 |
| 4,783,738 | 11/1988 | Li et al. | 364/200 |
| 4,807,183 | 2/1989 | Kung et al. | 395/325 |
| 4,811,214 | 3/1989 | Nosenchuck et al. | 364/200 |
| 4,831,572 | 5/1989 | Sekiguchi | 364/200 |
| 4,884,193 | 11/1989 | Lang | 364/200 |
| 4,907,148 | 3/1990 | Morton | 364/200 |

OTHER PUBLICATIONS

Philips Semiconductors, Eindhoven, The Netherlands, Jan. 1992, No. 939839340011.

Nineteenth Asilomar Conference on Circuits, Systems & Computers, Pacific Grove, Calif., Nov. 6-8, 1985, pp. 693-697, IEEE, Computer Society Press; Swarzlander: "A VLSI based ultra fast FFT".

"Warp Architecture and Implementation", M. Annaratone et al., 13th Annual Symposium on Computer Architecture, Jun., 1986, Tokyo (Japan).

Primary Examiner—Robert B. Harrell
Attorney, Agent, or Firm—Edward W. Goodman

[57] ABSTRACT

A coupling network for a data processor is described, including, one or more cross bar switches having inputs and outputs and one or more arrays of silos. A series connection is formed in which these components are alternately arranged in a succession having at least three elements. A retrocoupling network is used for coupling outputs of a data processor to its inputs, and it also provides external communication. The configuration offers ample freedom of mapping, notably in cyclostatic processors.

25 Claims, 3 Drawing Sheets

```
        Cycl. (m-1)                        Cycl. (m)

| a(m-1)   d(m-1)   g(m-1) || a(m)     d(m)     g(m)  |
| b(m-1)   e(m-1)   h(m-1) || b(m)     e(m)     h(m)  |
| c(m-1)   f(m-1)   i(m-1) || c(m)     f(m)     i(m)  |

| a(m-1)   g(m-2)   d(m-1) || a(m)     g(m-1)   d(m)  |
| e(m-2)   b(m-1)   h(m-1) || e(m-1)   b(m)     h(m)  |
| c(m-1)   f(m-1)   i(m-1) || c(m)     f(m)     i(m)  |
```

COUPLING NETWORK FOR A DATA PROCESSOR, INCLUDING A SERIES CONNECTION OF A CROSS-BAR SWITCH AND AN ARRAY OF SILOS

This is a continuation of application Ser. No. 07/446,491, filed Dec. 5, 1989 now abandoned.

BACKGROUND OF THE INVENTION

The invention relates to a coupling network for a data processor, comprising at least three first inputs for, on each thereof, coexistently receiving multibit input data and at least three first outputs for, on each thereof, coexistently outputting multibit output data, the coupling network comprising a cross-bar switch and an array of silos which is connected in series therewith. Such a coupling network is described in the previous, non-prepublished Netherlands Patent Application 8800071 corresponding U.S. patent application Ser. No. 285,187, file wrapped as U.S. Ser. No. 07/595,720, now U.S. Pat. No. 5,055,997 in the name of Applicant, which is incorporated herein by way of reference. Reference is made notably to FIG. 3. A coupling network of this kind is used in particular, but not exclusively, for a data processor which is suitable for digital signal processing, i.e. real-time processing of a signal stream in accordance with comparatively uncomplicated, cyclically activatable programs. The signal stream is usually related to a video signal which is sampled at a high speed. When more complex operations are to be executed, they are subdivided into sub-operations which are executed in parallel or in a pipe line organization. The sub-operations must effectively exchange data with one another and must also be executed as effectively as possible. The data processor usually comprises various processor elements, the coupling network serving inter alia as a retrocoupling network between the outputs and inputs of the respective processor elements on which the respective sub-operations are mapped. Another function of the coupling network may be the connection of an output (outputs) of a first data processor to an input (inputs) of one or more further data processors, each data processor comprising a sub-set of (one or more) processor elements. In all these cases unused capacity of the processor elements or the processors should be avoided. Furthermore, in many cases it appears to be necessary to buffer intermediate results during an arbitrarily selectable part of the same or a next program cycle, necessitating mapping of said intermediate result on a given phase of the program cycle. Furthermore, it is often necessary to apply input data or intermediate results to an arbitrarily selectable processor (element) input, so that bus conflicts could arise due to coincidence. Therefore, discrepancies must be solved which are liable to occur in the time domain as well as in the location domain (=given input). It has been found that the known coupling network, comprising only a single cross-bar switch followed by a single array of silos, offers insufficient possibilities in this respect.

SUMMARY OF THE INVENTION

It is one of the objects of the invention to enhance the possibilities for said mapping substantially by way of simple means which require few components, so that notably the formation of the programs is simplified while the flexibility of a coupling network or processor is increased.

In accordance with a first aspect of the invention, this object is achieved in that the coupling network comprises a series connection of at least three elements of a succession in which cross-bar switches and arrays of silos succeed one another in an alternating fashion. Such a coupling network is combined or not with one or more data processors/processor elements. The above flexibility increase could also be achieved by providing a respective silo,at each switch point of the cross-bar switch in the known circuit. It has been found, however, that this would lead to a much greater number of components for practical dimensions of the cross-bar switch.

In a preferred embodiment, the series connection comprises two cross-bar switches which are interconnected by way of an intermediate array of silos.

In a further preferred embodiment, the series connection comprises three cross-bar switches wherefrom there are formed two pairs which are each time interconnected by way of a respective array of silos. Using only limited means, the first preferred embodiment already offers an enhanced flexibility in comparison with the known coupling network, and the second embodiment offers complete flexibility by using slightly more means.

The invention also relates to a data processor comprising a coupling network of the described kind.

BRIEF DESCRIPTION OF THE DRAWINGS

The invention will be described in detail hereinafter with reference to some Figures, first a prior art data processor will be described, followed by a description of the mathematical foundation of the invention, of an optimum realization, and finally of two simplified embodiments in accordance with the invention.

DETAILED DESCRIPTION OF PREFERRED EMBODIMENTS OF THE INVENTION

Figures 1, 2:
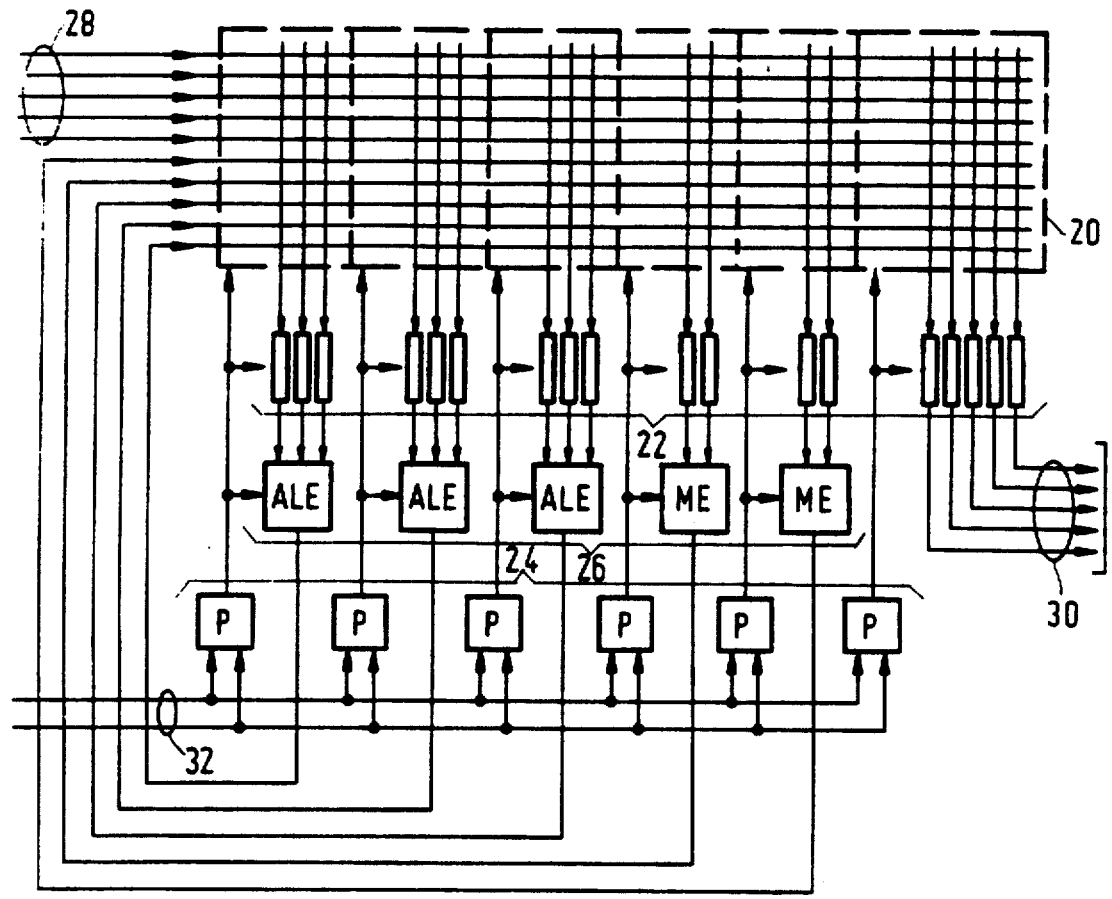
FIG. 1 shows a coupling network with a data processor in which the principle of the invention has not yet been realized.
FIG. 2 shows a number of data matrices for a coupling network in accordance with the invention.

FIG. 1 shows a prior art data processor comprising a coupling network and a plurality of parallel-operating processor elements in which the principle of the invention has not yet been realized. The coupling network comprises an input 28 which is constructed so as to be five-fold in the present example, i.e. five data can be received simultaneously. When each of the data contains, for example 8 bits, the path width of the input 28 must, therefore, be at least 40 bits. A sub-input may in principle be equipped for data having a smaller bit width. Furthermore, it is in principle also possible for the input lines to be connected in parallel, each data, however, being serially received on its particular and privy input. The first sub-system of the coupling network is the cross-bar switch 20 which in the present example comprises ten row connections and eighteen column connections, each of which offer passage to a data element of the selected standard size. Via connection elements (not shown), each switch point can be separately rendered transparent or not between the associated row and column. For useful operation, for each column in general only one connection element is transparent. Otherwise bus conflicts would be liable to occur between the various simultaneously received data per column. Generally, it is permissible for a plurality of connection elements to be transparent per row. The regular structure shown need not be as geometrically regular on an integrated circuit; it is only necessary that the logic set-up is regular. In given cases it is permissible that a comparatively small part of the switch points is implemented as a part which cannot be made transparent (notional) when the resultant reduction of the flexibility is permissible (for example, the direct connection of an external input to an external output).

The second sub-system of the coupling network is formed by an array of 18 silos 22, i.e. one for each column (output) of the cross-bar switch. A silo is a memory function which is capable of delaying data elements (signal samples), of repeatedly outputting one and the same signal sample from its memory (copying), and of permutating signal samples in time. This function can be realized, for example by means of a shift register which (sequentially) accepts signal samples, the output being derived at any instant from a shift register stage to be selected at will. In a preferred embodiment, this function is realized by means of a RAM memory which requires less substrate surface area. For faster operation a dual-ported RAM is chosen. Notably when the processor (elements) forms a cyclostatic organization, a dynamic RAM configuration can be used. This configuration comprises cells which are geometrically smaller than those in a static RAM. As a result of the cyclostatic organization, no separate rewrite organization need be provided: rewriting already takes place cyclically upon writing. Five of the silos are connected to the output 30 which has the same width as the input 28 for modular design reasons. This, however, is not strictly necessary. When the output 30 is connected to an input 28 of the same or another coupling network, the silos may also be considered to form part of said input 28 in as far as their operation is concerned. This proves that it is also possible to include silos in the input instead of in the output. It is in principle also possible to omit a comparatively small part of the silos when the resultant flexibility reduction and/or reduced ease of programming is acceptable.

The actual processing of the data takes place in a processor comprising five processor elements 26. Three of the five processor elements are arithmetic and logic units ALE. These units comprise three inputs, all of which are connected to the array of silos. In a preferred embodiment, two of the inputs serve for data which are subjected to operations which are known per se, such as addition, bit-wise comparison, bit-wise exclusive-OR and others. It is also possible to perform operations with only one operand, such as shifting or inverting. In an attractive embodiment, the third data is used for suppleting a microinstruction, or for replacing it completely or partly. It is also possible to perform operations on three parallel received data. On the other hand, the third connection for data may also be omitted. The ALE elements may be identical, thus facilitating programming, but this is not absolutely necessary. In addition to the ALE elements, there are provided two memory processor elements ME, each of which comprises two connections to the cross-bar switch, The first connection serves for supplying data for storage in the memory which is provided but which is not separately shown. The second connection serves for the supply of address data which addresses, possibly in cooperation with an already present address, a data in the local memory. In given cases only a data connection is present, but the flexibility is then substantially lower. The ultimate address may be the same as the address originating from the cross-bar switch. It may also be incremented, concatenated or otherwise treated by means of locally present information. The five processor elements together supply a result data to a respective associated row of the cross-bar switch.

There may be more or several kinds of processor elements, but also fewer. A minimum configuration consists of, for example one ALE with two inputs and one ME with two inputs. It is also possible per se to provide a dummy processor element by feeding the output of one of the silos directly back to a horizontal connection of the cross-bar switch.

The next sub-system of the processor is formed by the program memories (P) 24. These memories usually contain a fixed, limited number of jumpless microinstructions which are activated in successive clock cycles. The activated microinstruction is decoded in the processor unit (if necessary) and controls the operations in the processor element. The microinstruction also controls the addressing of the relevant silos. Finally, the microinstruction activates the 20 or 30 switch points associated with the relevant processor element. The program memories 24 are also connected to two lines 32. On these lines, a reset signal can appear for the memory so that, for example an address counter is set to an initial position. The starting of the various programs is thus synchronized. On this connection there may also appear initialization information whereby a given program memory can be addressed and subsequently filled with program information which is new or not new. A machine which continuously repeats the programs in an identical manner without interruption is referred to as a cyclostatic machine. On the one hand, such an application is very important, but, on the other hand, the invention is not restricted to such cyclostatic machines per se. For example, the program memory may be organized in accordance with a multi-page concept. In given operating circumstances, a command for changing the pages can then be received on the line 32. Such a circumstance may be, for example the fact that the source of the said video signals changes or that such a disturbance occurs that filter coefficients, error protection strategy or other strategies need be changed. It may also be that for given processor elements, the operation is cyclostatic, while for other processor elements, a first and a second series of instructions are alternately executed (for alternation, the processor would be cyclostatic again, be it with a prolonged period. Also during the initialization the processor is in principle non-cyclostatic (briefly)). The invention, however, is particularly attractive for use in a cyclostatic machine.

A cyclostatic machine has the following two important characteristics:

a) the procedure determining which processor elements execute operations on which signal samples (allocation) and at which instant (scheduling) can be fully predetermined, because it is data independent and periodical with a period of one program cycle;

b) successful mapping, that is to say allocation and scheduling, can in principle be executed in real time.

For realizing such a cyclostatic machine, in addition to the processor, also the switch matrix and the silo's must be controlled in a cyclostatic manner and with the same cycle recurrency. This applies both to the known machine and to those according to the invention. The number of instructions (or clock beats) within a program cycle is also referred to as the number of "phases" when they relate to the time axis. In order to impart full permutation capability to the silos, the silos must have a length of at least $N-1$ shift register elements in an N-phase machine. It is also to be noted that exclusively the program cycle is periodical, which does not imply that the signals are also periodical. In different program cycles, the signal samples usually also have different values.

An advantage of this architecture consists in that it offers a high (silicon) yield. Each operation to be executed on the signal samples present in the machine can be performed in a free time slot (clock beat) by a desired processor element if the relevant signal samples can be switched to the appropriate silos (associated with the desired element). Even though the device shown in FIG. 1 offers a high mapping freedom, conflicts can occur in practice because a given (vertical) connection in the cross-bar switch is to be simultaneously used by two different data: this would result in a bus conflict.

The invention inter alia aims to enable random allocation and scheduling; this is possible when the coupling network is capable of converting any arbitrary input matrix into an arbitrarily selected output matrix. A coupling network in accordance with the invention which satisfies this requirement consists of a cascade of a cross-bar switch, array of silo registers, cross-bar switch, array of silo registers, cross-bar switch as will be described hereinafter.

A cross-bar switch is capable of outputting at any instant an arbitrary permutation of the input data appearing on the various row connections, and also of directing input data to several outputs simultaneously (copying). The successive data in a complete cycle of N phases on the inputs of the coupling network can be represented as a matrix of N columns; similarly, a matrix of N columns can be assigned to the output data of the coupling network. The number of rows of both matrices is M, M being the maximum value of the number of inputs and the number of outputs of the coupling network. In this way, we get an input matrix and an output matrix that both have dimensions $M \times N$. If the number of inputs and the number of outputs are different, there are a number of "void" (non-defined) rows in the input or output matrix. The operations within the cross-bar switch imply the permutation and/or copying of elements within columns of the descriptive input matrix of the coupling network.

A silo is exclusively capable of delaying data. This means that data can be transferred from the phase j to the phase k subject to the condition that the phase k is later in time than the phase j (causality). Therefore, if $k < j$, k must relate to a program cycle later than j.

In this respect FIG. 2 shows a number of data matrices for a coupling network in accordance with the invention. The upper sequence consists of successive input matrices and the lower sequence consists of successive output matrices, both sequences relating to the same time axis.

In the $m^{th}$ cycle, data g and e in the output matrix are derived from the input matrix of the cycle $m-1$ for reasons of causality. When the program cycle index can be arbitrarily selected for any data in the output matrix by means of an independent mechanism, the above problem can be reduced to converting of the matrix

| a d g |   |                 | a g d |
|-------|---|-----------------|-------|
| b e h | * | into the matrix | e b h |
| c f i |   |                 | c f i |

This mechanism is inherently provided by the silo function, subject to the following three conditions:
a) all input matrix data which occur in the output matrix must always be passed through a silo somewhere in the coupling network. This is because a silo is capable of outputting data and also corresponding data from a previous cycle.
b) all data copied by the cross-bar switch must subsequently be passed through a silo again. This is because the cross-bar switch itself does not have a memory, so that the cycle index of the copy cannot be chosen at random but is always the same as that of the original.
c) a silo must be long enough for delaying data to a desired later cycle.

Thus, data x(m) can always be replaced somewhere in the coupling network by $x(m-j)$, $j=1, 2, 3 \ldots$ Only coupling networks satisfying the above three conditions will be considered. Thus, a silo in a cyclostatic machine having N phases can permutate and/or copy its input data (without cycle index) over N phases. In the matrix, this corresponds to the permutation and/or copying of data within rows.

When a coupling network is constructed by means of a cross-bar switch having M outputs, a silo being connected to each output, the input matrix can be treated by permutating and/or copying first within columns and, followed by permutation and/or copying within rows in the matrix then obtained. When a second cross-bar switch comprising M inputs is added, in a third step permutation and/or copying can again be performed within columns. Such a network will be referred to hereinafter as an sw-si-sw combination. When the latter also copies, it will not always satisfy the condition b: the cycle index of any copies made in the cross-bar switch can no longer be chosen at random.

A matrix dimensioned $M \times N$ can be converted, regardless of M and N, into an arbitrary other matrix of these dimensions, containing the same data as the original matrix, by executing the following three successive steps: in step a: permutate the data occurring in one column in the output matrix to different rows; in step b: permutate the data to the columns in which they occur also in the output matrix; in step c: permutate the data so that they are situated in the desired rows.

EXAMPLE

|              | step a |               | step b |               | step c |              |
|--------------|--------|---------------|--------|---------------|--------|--------------|
|          a d g | a f h |               | a h f  |               | a b c  |              |
| input matrix b e h → | b d i  | →      | d b i  | →             | d e f  | output matrix |
|          c f i | c e g |               | g e c  |               | g h i  |              |

It can be simply demonstrated that two steps, corresponding to an sw-si or an si-sw network, do not suffice for realizing all possible permutations. Therefore, the coupling network shown in FIG. 1 does not offer full mapping freedom.

It is assumed that k copies must be made in an M×N matrix (possibly including several copies of one and the same element) at the expense of k elements to be selected at random which will no longer occur in the output matrix.

It can be demonstrated that the k copies (k<MN) can always be realized by means of an sw-si-sw combination and that the originals can also be passed to the output of the combination. The location of the elements in the output matrix, however, cannot always be arbitrarily chosen for all elements. In order to realize the copies, it suffices that the first switch in the sw-si-sw combination exclusively permutates (and does not copy), that the silos exclusively copy (and hence do not permutate), and that the last switch also copies exclusively. When the combination is used in this manner, it does not satisfy the above condition b.

A method to determine, how permutating must be realized in the first step, and copying in the second and the third step, is as follows. A rank $r_{ij}$ is assigned to each element $a_{ij}$ of the input matrix. The value of $r_{ij}$ is determined by the number of the same $a_{ij}$ occurring in the output matrix, reduced by 1:

the element $a_{ij}$ no longer occurs in the output matrix because it has been erased by a copy of another element: $r_{ij}= -1$ (this is referred to as a "hole")

the element $a_{ij}$ occurs only once in the output matrix: $r_{ij}=0$ (the original is passed to the output)

the element $a_{ij}$ occurs k+1 times in the output matrix: $r_{ij}=k$ (this is referred to as a "source").

Thus, one property consists in that the sum of all ranks in the matrix is zero. To each column there is assigned a value which is equal to the sum of all ranks in this column. The sum of all column values, therefore, also equals zero. A column may be positive, neutral or negative. The entire matrix will now be treated in a number of steps ($\leq N-1$) with the aim of neutralizing each time one column:

a. a column pair consisting of a "first" column and a "second" column is selected, the column values thereof having an opposite sign. When all columns are neutral, only step c need be executed only once. A single non-neutral column cannot occur, because the sum of the column values must be zero. The elements within the "second" column are permutated so that as many sources and holes are horizontally paired.

b. so many copies are then realized within rows of these two columns that the column having the lowest absolute column value is neutralized: for each copy realized the rank of the source is reduced by 1 and the rank of the hole is increased by 1 (a hole may thus become a source). The non-neutralized column thus obtains a new column value equal to the sum of the original column values.

c. the possible copies are realized within neutral columns.

Should non-neutral columns still remain, the procedure recommences with the step a, possibly using the non-neutral column remaining in the step b as the "first" column of the new column pair. After all columns have been dealt with, the last column in the step b thus obtains the accumulated sum of all column values. As has already been stated, this sum equals zero, so that all columns have then been neutralized. In this way, we have found for all phases, all states of the crossbar switch or switches and for all silo's, to realize the necessary copies.

Other possibilities also exist, i.e. the copying by means of the first cross-bar switch, the permutation by means of the silos, and the permutation by means of the last cross-bar switch, thus enabling given elements to be permutated to a desired location in the output matrix or even, for given combinations of input and output matrices, the copying and permutation actions to be realized completely by means of one combination, be it only in a part of all cases. Thus, this realization only conditionally satisfies the object.

A coupling network which is capable of copying as well as permutating is obtained by making a first sw-si-sw combinations realize the copies and making a second sw-si-sw combination, in cascade with the first combination, realize the permutation. It is not objectionable that the copier does not have full freedom as regards the location of the elements in its output matrix, because the permutator can realize any desired permutation any how. Moreover, the integral coupling network satisfies the condition b, i.e. the condition that copies made by the last switch of the copier must again be passed through silos. This is because these copies are passed through the silos of the permutator. The two switches in the middle of the integral network can be replaced by one switch. Thus, an sw-si-sw-si-sw network is obtained which fully implements the desired function.

In addition to the above coupling networks, the cross-bar switches and arrays of silos can also be combined in other ways:

si-sw-si-sw sw-si-sw-si and different coupling networks may have components in common in given cases, depending on the space available on an integrated circuit and on the desired flexibility.

Figure 3:
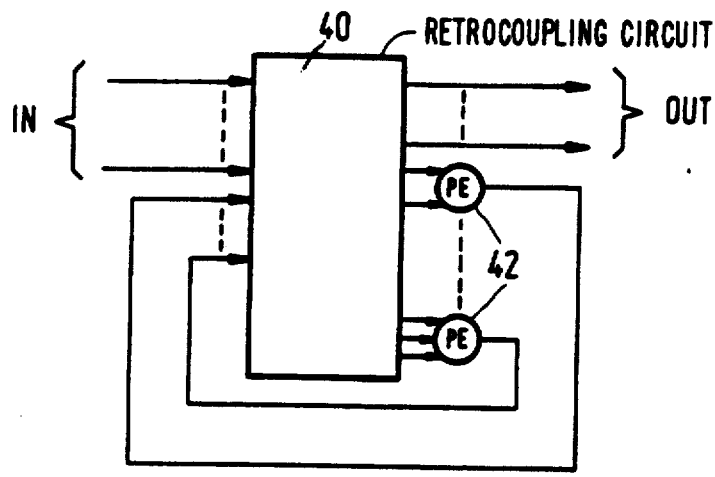
FIG. 3 shows a diagram illustrating a general set-up of a coupling network with data processor.

FIG. 3 shows a general set-up of a coupling network comprising a data processor. The entire combination, possibly together with other parts, is realized on an integrated circuit by means of known, conventional techniques. Thus, there are shown at the left an external input and at the right an external output, and also a number of processor elements PE(42) and a retrocoupling circuit 40 between the outputs of the respective processor elements and their inputs. The external input and the external output are also connected thereto. This diagram symbolizes the known solution as well as the improvement in accordance with the invention.

Figure 4:
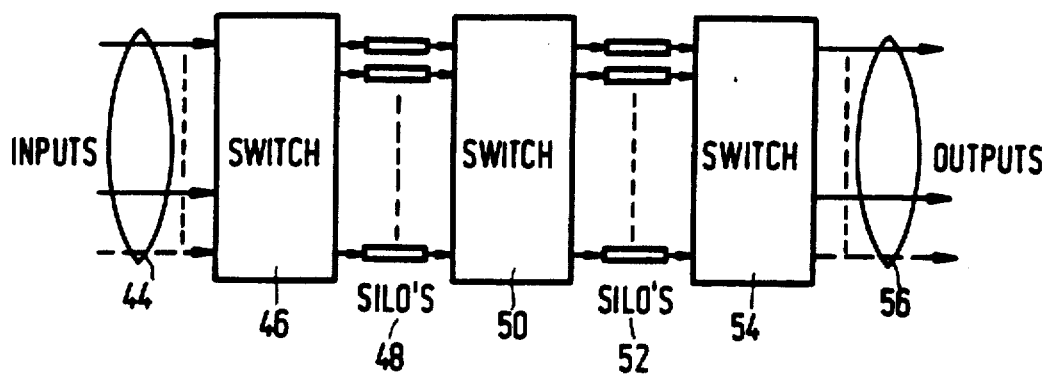
FIG. 4 shows a coupling network in accordance with the invention.

FIG. 4 shows a coupling network in accordance with the invention for use in a processor as shown in FIG. 3. It comprises inputs 44 which may be retrocoupled inputs as well as external inputs. A first cross-bar switch 46 is connected thereto. Connected thereto is an array of silos 48. This array is followed by successively a cross-bar switch 50, a second array of silos 52, and a third cross-bar switch 54. The outputs 56, including the external output, are connected to the latter switch. When a cross-bar switch comprises 18 data inputs and 18 data outputs, the dimension on an integrated circuit will be approximately as large as that of an array of 18 silos having a depth of 16 locations. Thus, for dimensions 10×18, it is equal to approximately one half array of silos. The surface area of the set-up shown in FIG. 1 then corresponds to approximately 1½ arrays of silos.

That shown in FIG. 4 corresponds to approximately 4½ arrays of silos, inasmuch as the dimensions of the first matrix are 10×18, those of the other two, 18×18 each. The previously mentioned, space consuming case where each switch point of the 10×18 cross-bar switch is provided with its own silo would correspond to approximately 10¼ arrays of silos. For other dimensions the advantages offered by the invention are accordingly large. Notably in the case of large cross-bar switches, the invention is particularly advantageous because of its space saving effects. The ease of programming in accordance with the invention also represents a major advantage, because the possibility of bus conflicts need not be taken into account.

The processor shown can be introduced into an hierachical set-up again in accordance with the state of the art: the processor elements then form the lowest level, a plurality of processors together performing the data processing.

Figure 5:
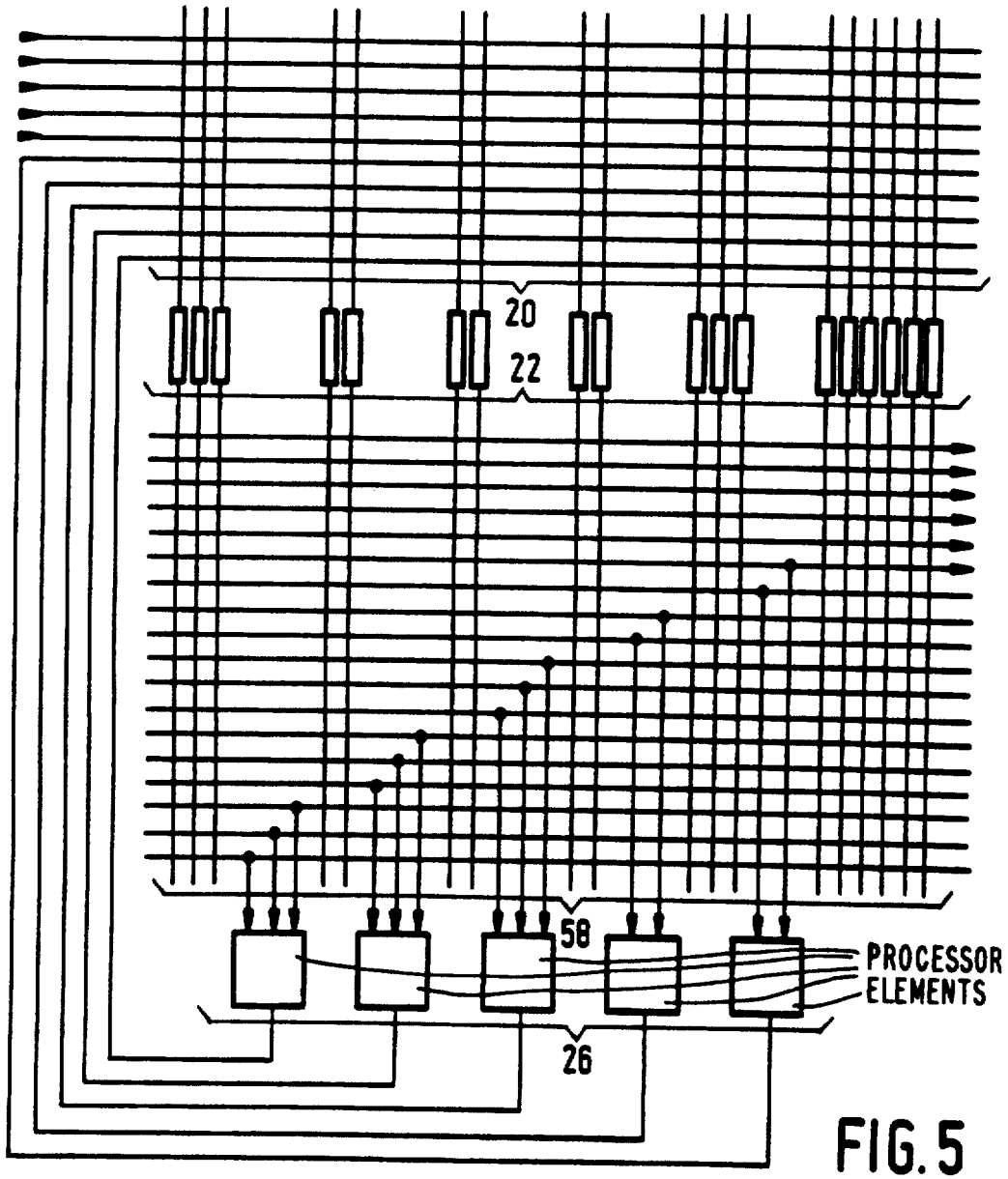
FIG. 5 shows a detailed diagram of a coupling network with data processor in accordance with the invention in a simpler version in comparison with FIG. 4.

FIG. 5 shows a detailed diagram of a comparatively simple set-up in accordance with the invention. The set-up of the processor elements is that shown in FIG. 3 (26). There is shown a primary cross-bar switch dimensioned 10×18 (20). There is also shown an array of silos (22) comprising 18 silos. As an extension there is shown a second cross-bar switch 58 dimensioned 18×18. Programming has been omitted for the sake of simplicity. It is to be noted that the dimensions of the cross-bar switches are determined by the number of connections of the processor elements and the numbers of external inputs/outputs. The depth of the silos can in principle be chosen arbitrary.

For given applications, the dimensions of the cross-bar switches will be much smaller than in the example shown: when there are two processor elements comprising three inputs and two inputs, respectively, the dimensions of the first cross-bar switch will be, for example 4×5, and those of the second cross-bar switch will be 5×5. The width of the array of silos then amounts to 5; the depth is determined by the program structure, for example 4, 8, 16, 32 . . . locations.

Figure 6:
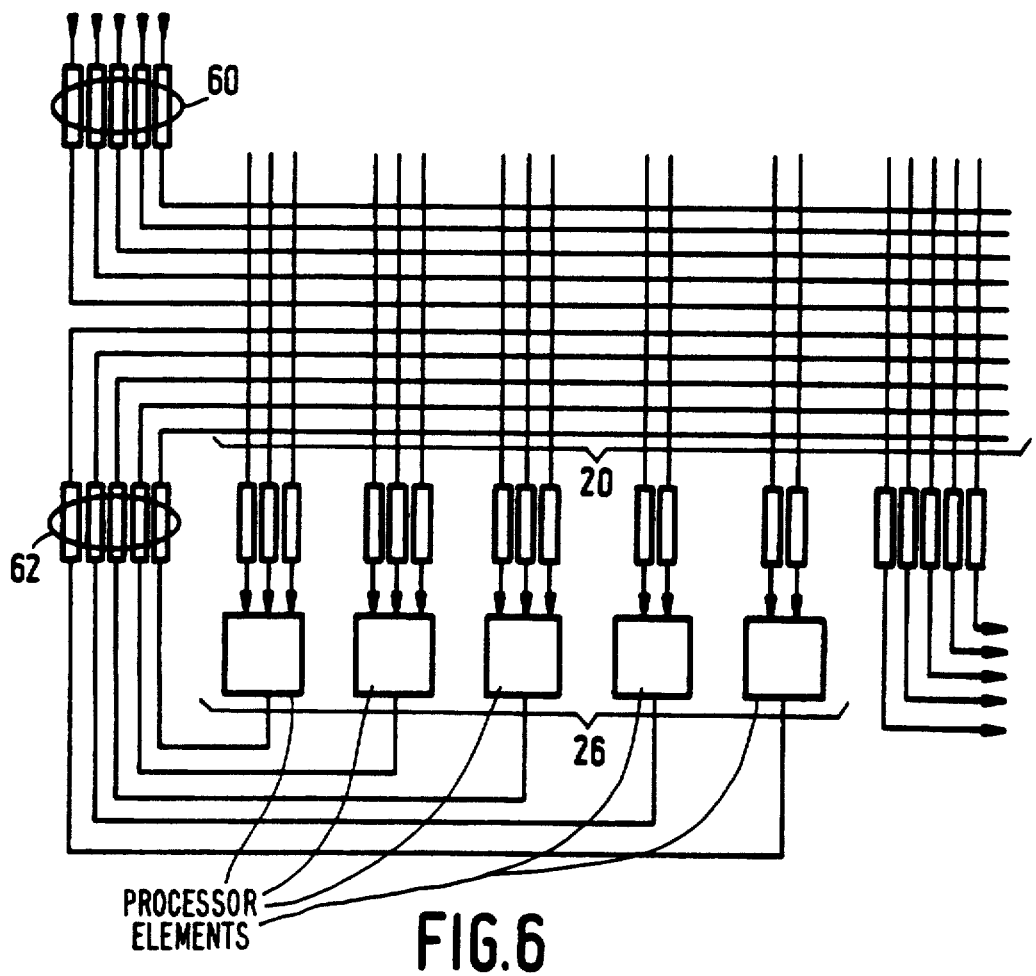
FIG. 6 shows the same for another version.

FIG. 6 shows a detailed diagram of another comparatively simple set-up in accordance with the invention. The operations which can be performed on a data matrix by means of an sw-si-sw combination successively consists of, as has already been stated, permutation and/or copying within columns, subsequently within rows and again within columns. When each matrix A can be converted into any desired matrix B, the transposition of A can also be converted into the transposition of B. For the transposed matrix, the same operations as performed on A and B then become permutation and/or copying within rows, subsequently within columns and subsequently within rows again. These operations can be realized by means of an si-sw-si network. When the transposed matrices are considered to be actual input matrices and output matrices of the network, it may be concluded that an si-sw-si combination can also act as a permutator or copier. These networks will be referred to as transposed networks.

The cross-bar switch 20, the silo's 22, and the processor elements 26 again correspond to those of FIG. 1. All inputs of the cross-bar switch now have their own silo (60, 62), so that the number of silos for the complete set-up is increased to 28.

Similarly, the number of stages of the retrocoupling circuit can be increased to 4 or 5. Various possibilities exist in this respect.

We claim:

1. A data processor module having first input channels and first output channels, and including a coupling network with second input channels and second output channels and an array of at least three parallel processing elements that, in part, have two third input channels and, in part, have three third input channels, each of said three parallel processing elements having a third output channel, wherein all of said third input channels and said first output channels are fed by mutually unique of said second output channels and all of said third output channels and said first input channels feed mutually unique of said second input channels, wherein said coupling network comprises a series connection of at least three elements of a succession in which one or more programmable cross-bar switches and one or more linear arrays of silo memories succeed one another in alternating fashion, wherein each silo memory accommodates cyclic storage of a plurality of information items up to a predetermined cycle length, and has random selection functionality at the output of said silo memory among said storage, wherein said first input channels are directly clock-controlled, and wherein each of said processing elements has a program memory privy thereto for controlling both local processing operations thereof and final silo layer in said series connection for so controlling reception of either multiple copies of a single data element or arbitrary reshuffling reception sequence of elements present in said silo for forwarding to the latter processing element.

2. A data processor as claimed in claim 1, wherein the data processor comprises processor means which are fed by a part of said first outputs and which feed a further part of said first inputs, the processor means being activatable by jumpless program information of a fixed cycle length.

3. A data processor as claimed in claim 2, wherein the processor means comprise at least two parallel-operating processor elements, each of which comprises at least two second inputs and at least one second output, said second inputs/outputs are all separately connected to the coupling network, the jumpless program information for each processor element having a respective, synchronously activatable program of fixed cycle length.

4. A data processor as claimed in claim 3, wherein the data processor is integrated on a single substrate area element.

5. A data processor as claimed in claim 2, wherein the data processor is integrated on a single substrate area element.

6. A data processor as claimed in claim 5, wherein at least one of the programmable cross-bar switch points is addressable.

7. A data processor as claimed in claim 1, wherein said data processor is integrated on a single substrate area element.

8. A data processor as claimed in claim 7, wherein the data processor comprises processor means which are fed by a part of said first outputs and which feed a further part of said first inputs, the processor means being activatable by jumpless program information of a fixed cycle length.

9. A data processor as claimed in claim 8, wherein the processor means comprise at least two parallel-operating processor elements, each of which comprises at least two second inputs and at least one second output, said second inputs/outputs being all separately connected to the coupling network, the jumpless program information for each processor element having a respective, synchronously activatable program of fixed cycle length.

10. A data processor as claimed in claim 1, wherein said series connection comprises two linear arrays of silo memories which are interconnected by way of a programmable cross-bar switch.

11. A data processor as claimed in claim 10, wherein the series connection successively comprises a first programmable cross-bar switch, a first linear array of silo memories, a second programmable cross-bar switch, and a second linear array of silo memories.

12. A data processor as claimed in claim 10, wherein the series connection successively comprises a first linear array of silo memories, a first programmable cross-bar switch, a second linear array of silo memories, and a second programmable cross-bar switch.

13. A data processor as claimed in claim 1, wherein the series connection successively comprises a first linear array of silo memories, a first programmable cross-bar switch, a second linear array of silo memories, and a second programmable cross-bar switch.

14. A data processor as claimed in claim 13, wherein said series connection comprises three programmable cross-bar switches wherefrom there are formed two pairs which are each time interconnected by way of a respective linear array of silo memories.

15. A data processor as claimed in claim 1, wherein said series connection comprises three programmable cross-bar switches wherefrom there are formed two pairs which are each time interconnected by way of a respective linear array of silo memories.

16. A data processor as claimed in claim 15, wherein said data processor is integrated on a single substrate area element.

17. A data processor as claimed in claim 1, wherein at least one of the programmable cross-bar switch points is addressable.

18. A data processor as claimed in claim 17, wherein at least one of the silo memories is addressable.

19. A data processor as claimed in claim 1, wherein at least one of the silo memories is addressable.

20. A data processor as claimed in claim 19, wherein said first outputs operate fully in parallel.

21. A data processor as claimed in claim 1, wherein said first outputs operate fully in parallel.

22. A data processor as claimed in claim 21, wherein at least a part of at least one linear array of silo memories is constructed as a dynamic RAM memory.

23. A data processor as claimed in claim 1, wherein said series connection comprises two programmable cross-bar switches which are interconnected by way of a linear array of silo memories.

24. A data processor as claimed in claim 1, wherein the series connection successively comprises a first programmable cross-bar switch, a first linear array of silo memories, a second programmable cross-bar switch, and a second linear array of silo memories.

25. A data processor as claimed in claim 1, wherein at least a part of at least one linear array of silo memories is constructed as a dynamic RAM memory.

* * * * *